United States Patent
Krach

(10) Patent No.: US 12,035,271 B2
(45) Date of Patent: Jul. 9, 2024

(54) SYSTEM AND METHOD FOR DETECTING AND LOCATING A SIGNAL SOURCE

(71) Applicant: Airbus Defence and Space GmbH, Taufkirchen (DE)

(72) Inventor: Bernhard Krach, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 213 days.

(21) Appl. No.: 17/701,215

(22) Filed: Mar. 22, 2022

(65) Prior Publication Data
US 2022/0312363 A1  Sep. 29, 2022

(30) Foreign Application Priority Data

Mar. 23, 2021 (DE) ...................... 10 2021 107 220.4

(51) Int. Cl.
| | |
|---|---|
| H04L 9/40 | (2022.01) |
| G06F 21/31 | (2013.01) |
| H04B 7/04 | (2017.01) |
| H04W 64/00 | (2009.01) |

(52) U.S. Cl.
CPC ............ H04W 64/003 (2013.01); H04B 7/04 (2013.01)

(58) Field of Classification Search
CPC ........... H04W 64/003; H04B 7/04; G01S 3/38
USPC ....................................................... 455/456.1
See application file for complete search history.

(56) References Cited

U.S. PATENT DOCUMENTS

| | | | |
|---|---|---|---|
| 8,116,350 B1 * | 2/2012 | Arndt ........................ | G01S 5/12 |
| | | | 375/267 |
| 2017/0090009 A1 * | 3/2017 | Amishima ............ | G01S 5/0218 |

FOREIGN PATENT DOCUMENTS

| | | |
|---|---|---|
| EP | 1 903 348 A1 | 3/2008 |
| EP | 3 314 963 B1 | 4/2019 |
| WO | WO 99/57574 A1 | 11/1999 |
| WO | WO 2016/207603 A1 | 12/2016 |

OTHER PUBLICATIONS

European Search Report for Application No. 22160236 dated Jul. 22, 2022.
German Office Action for Application No. 102021107220 dated Nov. 26, 2021.

* cited by examiner

*Primary Examiner* — Tanmay K Shah
(74) *Attorney, Agent, or Firm* — KDW Firm PLLC

(57) ABSTRACT

Systems and methods for detecting and locating a signal source. The system contains an antenna array with antennas, a control unit that is connected to the antenna array, and an evaluation unit to receive data from the control unit. The antennas are designed to acquire a signal emitted by the signal source. The control unit is designed to ascertain a cross-correlation or covariance matrix of a signal received from the antenna array, and to transmit the cross-correlation or covariance matrix to the evaluation unit. The evaluation unit is designed to ascertain a position of the signal source on the basis of the cross-correlation or covariance matrix received from the control unit.

8 Claims, 3 Drawing Sheets

SYSTEM AND METHOD FOR DETECTING AND LOCATING A SIGNAL SOURCE

CROSS-REFERENCE TO RELATED APPLICATION

This application claims priority to German Patent Application No. DE 10 2021 107 220.4 filed Mar. 24, 2021, the entire disclosure of which is incorporated by reference herein.

TECHNICAL FIELD

The present description relates generally to the technical field of signal reconnaissance, for example electromagnetic or acoustic reconnaissance, as well as tracing sources that emit signals, known as signal sources. The description relates in particular to systems and methods for detecting and locating a signal source.

BACKGROUND

Detecting and locating electromagnetic signal sources has a high significance for the preparation of an accurate picture of the situation, in particular in the military environment. Electromagnetic signals are, for example, emitted by hostile weapons systems or reconnaissance systems. Detecting and locating such signal sources thus offers the possibility of evading the influence of hostile weapons systems and/or detection by hostile reconnaissance.

A conventional approach to the detection and location of signal sources is known under the name of "triangulation". Multiple sensors here detect and locate a signal source and determine the relative position of the signal source with respect to the sensors' position. This position of the signal source relative to the position of the sensors can be quoted as a direction vector. The direction vectors from multiple sensors (at least two, usually at least three) can be used to determine their intersection point. The intersection point, or a region around the intersection point, can then be given as the location of the signal source.

While the simplicity of this approach is impressive, it can, however, also have certain disadvantages. If, for example, a sensor cannot determine the direction of the signal source, for whatever reason, determining the position of the signal source is, in the worst case, entirely impossible.

SUMMARY

Executing the process of detecting and locating a signal source with higher reliability and/or accuracy, and in particular also facilitating it for signals of low intensity, can be seen as the object.

This object is achieved by the subject matter disclosed herein. Further embodiments are disclosed in the following description.

According to a first aspect, a system for detecting and locating a signal source is given. The system comprises an antenna array with a plurality of antennas, a control unit that is connected to the antenna array, and an evaluation unit. The evaluation unit is designed to receive data from the control unit. The antennas are designed to acquire a signal emitted by the signal source. The control unit is designed to ascertain a cross-correlation or covariance matrix of a signal received from the antenna array. The control unit is designed to transmit the cross-correlation or covariance matrix to the evaluation unit. The evaluation unit is designed to ascertain a position of the signal source on the basis of the cross-correlation or covariance matrix received from the control unit.

The system described here makes it possible to detect, locate and track signal sources passively. An antenna array that acquires the signals from the signal source is used for this purpose. In particular, the system makes it possible for signal sources that emit signals of low power to be detected. Instead of the antenna array ascertaining an angle of incidence of the signal emitted by the signal source, a cross-correlation or covariance matrix is calculated on the basis of the signals received by the individual antennas of the antenna array, this then being transmitted to the evaluation unit where the cross-correlation or covariance matrix is employed to ascertain the position of the signal source. The system described here makes it possible for the cross-correlation or covariance matrix of an antenna array that is a part of a platform or sensor platform to be exchanged with other sensor platforms or with a central instance, for example the evaluation unit, before each individual sensor platform has itself determined a direction to the signal source. Instead of the angle of incidence and the time intervals between individual measurements of the individual antennas of the antenna array, the cross-correlation or covariance matrix is exchanged and employed for the determination of the position of the signal source in the evaluation unit.

Even though reference is made, by way of example, to electromagnetic signals in connection with this description, the system and the method can also be used for the detection and location of other signal types, acoustic signals for example. The term "antenna" is to be understood here to refer to an apparatus that is designed to acquire the type of signal that is to be detected.

The evaluation unit can be disposed spatially separate from the antenna array and the control unit. The antenna array and the control unit are, for example, arranged on board a mobile carrier unit such as an aircraft. The evaluation unit can be located on board a different aircraft. Alternatively, the evaluation unit can also be arranged in a ground station. In another embodiment, the evaluation unit is arranged on board the same aircraft that is also carrying the antenna array and the control unit.

The plurality of antennas of the antenna array receive a signal emitted by the signal source. The signal being received by the plurality of antennas at any one time is used by the control unit to ascertain the cross-correlation or covariance matrix.

It is provided that the cross-correlation or covariance matrix of an antenna array is transmitted to the evaluation unit. This matrix is the data basis from which the angle of incidence onto the antenna array of an electromagnetic wave, for example of a high-frequency signal, is ascertained. Instead of the angle of incidence of a signal and the phase differences between the signals acquired by the individual antennas of the antenna array, the matrix is transmitted to the evaluation unit. The matrix can be transmitted to the evaluation unit at time intervals that repeat regularly or irregularly. Ascertaining the position of the signal source is performed in the evaluation unit. It is not necessary for the control unit that is connected to the antenna array to successfully complete a detection and/or location process for the signal source. The control unit, rather, transmits a matrix having N×N fields, wherein N is the number of antennas, to the evaluation unit, where the signal source is then located and detected. This matrix can, in particular, be symmetrical, so that it is sufficient if half of the fields of the matrix are transmitted, which further reduces the amount of data to be transmitted.

The control unit in particular ascertains a coherent cross-correlation or covariance matrix, which means that a cross-correlation or covariance matrix of a signal with the same time basis is ascertained. The cross-correlation or covariance matrix in particular contains information relating to the statistical properties of a signal, and, for example, expresses the way in which the signal from one antenna of an antenna array is correlated with that of a different antenna of the same antenna array. The control unit constructs a cross-correlation or covariance matrix starting from a received matrix of the individual antennas of the antenna array. The cross-correlation or covariance matrix contains information about the amplitude and phase of a signal. This information is transmitted by the control unit in the cross-correlation or covariance matrix to the evaluation unit, where it is used to ascertain the position of the signal source. In addition to the information relating to the received signal, further information is also transmitted to the evaluation unit, for example the position and/or the alignment and/or the geometry of an antenna array.

The antenna array comprises a plurality of antennas that are spatially separate from one another, or at a distance from one another.

This construction, and the location of a signal source by the evaluation unit on the basis of the cross-correlation or covariance matrix, has the advantage that the control unit, and an associated antenna array, does not necessarily itself have to perform a successful location of the signal source. The evaluation unit can receive a cross-correlation or covariance matrix from each of multiple antenna arrays, or can use multiple cross-correlation or covariance matrices that have been supplied at different time points by the same antenna array to detect and locate the signal source.

The approach described here can enable a more accurate location (detection, location, tracking) of a signal source, since the cross-correlation or covariance matrix of multiple antenna arrays, or of the same antenna array at different time points, are combined in order to execute the location in the evaluation unit. An improved effective signal-to-noise ratio thus results, and it is also possible to locate signal sources that possibly cannot be located by a single platform with a single antenna array.

According to one embodiment, the control unit is designed also to transmit the following information about the antenna array to the evaluation unit, in addition to the cross-correlation or covariance matrix: the position of the antenna array at the time point at which the signal emitted by the signal source was acquired; the alignment of the antenna array; the size and/or geometry of the antenna array; a noise power level.

The transmission of this information to the evaluation unit makes it possible, for example, for the position of the signal source to be ascertained in position coordinates in any desired format, for example WGS-84, latitude/longitude/altitude, absolute Cartesian coordinates etc., and that a triangulation is no longer necessary.

According to a further embodiment, the system comprises a plurality of antenna arrays and a plurality of control units, wherein a control unit is assigned to a respective antenna array, wherein each antenna array of the plurality of antenna arrays is spatially distanced from the other antenna arrays of the plurality of antenna arrays, and is arranged to acquire the signal emitted by the signal source from its own respective direction, wherein each control unit is designed to ascertain the cross-correlation or covariance matrix of the antenna array assigned to it, and to transmit the ascertained cross-correlation or covariance matrix to the evaluation unit, and wherein the evaluation unit is designed to ascertain the position of the signal source on the basis of at least some of the cross-correlation or covariance matrices received from the plurality of control units.

In this embodiment, the signal emitted by the signal source is acquired by a plurality of antenna arrays that are located at different positions. Each antenna array acquires the signal in accordance with its relative position to the signal source and its alignment to the signal source. The control unit assigned to an antenna array ascertains the corresponding cross-correlation or covariance matrix, and transmits this to the evaluation unit.

The evaluation unit can employ all of the cross-correlation or covariance matrices, or some of the cross-correlation or covariance matrices, to ascertain the position of the signal source on the basis of the cross-correlation or covariance matrices.

According to a further embodiment, the evaluation unit is arranged spatially separate from all of the antenna arrays and control units.

The evaluation unit can, for example, be arranged in a ground station, which can be referred to as a control center. It is also conceivable that the evaluation unit is located on board another aircraft. In any event, the evaluation unit receives data from the control unit/units and the antenna arrays/arrays.

The antenna arrays and the control unit are units which receive a signal but which themselves, however, do not have a function for locating the signal source. The control unit, rather, ascertains the cross-correlation or covariance matrix of a signal received from the antenna array assigned to it, and transmits the cross-correlation or covariance matrix to the evaluation unit, where the location is performed.

According to a further embodiment, the evaluation unit is arranged, together with the antenna array and the control unit, in a mobile unit.

In this design, the evaluation unit is arranged, for example, on board an aircraft, and this aircraft also contains at least one antenna array and at least one control unit that ascertains the cross-correlation or covariance matrix of a signal received from the antenna array, and transmits it to the evaluation unit. This aircraft can be designed to receive the cross-correlation or covariance matrix from other antenna arrays spatially distanced from the aircraft, and ascertain the position of the signal source on that basis.

According to a further embodiment, the control unit is designed to transmit the cross-correlation or covariance matrix of the antenna array from a plurality of temporally sequential signal acquisition processes to the evaluation unit.

It is thus possible to ascertain the position of a signal source with a single antenna array, in that this antenna array acquires signals at different time points, i.e. performs multiple temporally sequential signal acquisition processes.

To be able to distinguish the signal of one signal source from signals of other signal sources and track it over time, it is for example possible for what are known as tracking filters to be used; these characterize a signal and can distinguish it from other signals with a certain probability.

The temporally sequential signal acquisition processes can take place at different positions of the antenna array, which means that the antenna array is located at different geographical positions at the time points of the temporally sequential signal acquisition processes. This makes it possible to ascertain the position of a stationary signal source.

According to a further aspect, a method for detecting and locating a signal source is given. The method has the following steps: acquisition of a signal emitted by the signal source by an antenna array; ascertaining a cross-correlation or covariance matrix of the acquired signal; transmitting the cross-correlation or covariance matrix to an evaluation unit; and ascertaining a position of the signal source in the evaluation unit on the basis of the cross-correlation or covariance matrix.

The method represents the steps that are, for example, carried out by the system described herein. The method steps in particular correspond to the functions of the system. For that reason, reference is made to the functions described in connection with the system for the details of the individual method steps.

The method described herein is largely characterized in that the position of the signal source does not take place on the basis of a triangulation, which requires ascertainment of the position of the signal source through multiple sensors, but rather the ascertainment of the position of the signal source is performed on the basis of a cross-correlation or covariance matrix of a signal acquired from an antenna array. The quantity of data transmitted between the antenna arrays, which are, for example, arranged non-centrally, and the evaluation unit can be reduced in this way. Ascertaining the position is in particular performed centrally in the evaluation unit. If multiple antenna arrays are used to acquire a signal emitted by the signal source, an effective signal-to-noise ratio can be improved at the central location of the evaluation unit by using the cross-correlation or covariance matrices from multiple antenna arrays, so that even signal sources that are difficult to discover can be detected and located.

The method thus provides a separation between the signal acquisition on the one hand and the detection and location of the signal source on the other hand. The signal acquisition is carried out non-centrally by one or a plurality of antenna arrays, the cross-correlation or covariance matrix is formed from the acquired signal, and this cross-correlation or covariance matrix from one or a plurality of antenna arrays is employed in the evaluation unit to ascertain the position of the signal source.

According to one embodiment, the signal emitted by the signal source is acquired by a plurality of antenna arrays that are arranged at different geographical positions. A cross-correlation or covariance matrix is ascertained for each acquisition of the signal emitted by the signal source by each antenna array. The position of the signal source is ascertained on the basis of at least some (i.e. two or more) of the ascertained cross-correlation or covariance matrices.

In this variant of the method, the signal emitted by the signal source is acquired at essentially the same time by a plurality of antenna arrays at different geographical positions, wherein an antenna array with its multiple antennas ascertains the phase differences of the signals acquired by the individual antennas.

According to a further embodiment, the signal emitted by the signal source is acquired with a single antenna array at different time points at different positions. A cross-correlation or covariance matrix is ascertained for each acquisition of the signal emitted by the signal source by the individual antenna array. The position of the signal source is ascertained on the basis of at least some of the ascertained cross-correlation or covariance matrices.

In this embodiment, the signal is acquired by a single antenna array at different time points at different geographical positions of the antenna array. This embodiment is in particular suitable for ascertaining the position of a stationary signal source, since the antenna array is located at different positions for the different acquisition processes of the emitted signal.

According to a further embodiment, the following information about the antenna array is transmitted to the evaluation unit, in addition to the cross-correlation or covariance matrix: the position of the antenna array at the time point at which the signal emitted by the signal source was acquired; the alignment of the antenna array; the size and/or geometry of the antenna array; a noise power level.

BRIEF DESCRIPTION OF THE DRAWINGS

Example embodiments are considered in more detail below with reference to the appended drawings. The illustrations are schematic and not true to scale. The same reference signs refer to identical or similar elements. In the figures.

DETAILED DESCRIPTION

Figure 1:
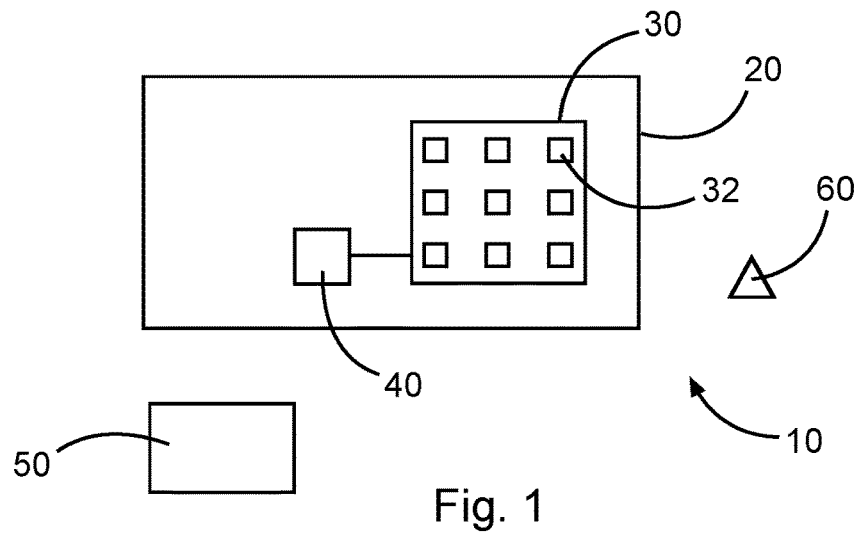
FIG. 1 shows a schematic illustration of parts of a system according to one example embodiment.

FIG. 1 shows a system generally designated 10 for detecting and locating a signal source 60 on the basis of signals that are emitted by the signal source 60. The system 10 comprises a carrier platform 20, for example a mobile platform in the form of an aircraft. The carrier platform 20 carries an antenna array 30 with a plurality of antennas 32 as well as a control unit 40 connected to the antenna array 30.

The antenna array 30 receives a signal emitted by the signal source 60. The control unit 40 ascertains a cross-correlation or covariance matrix for the signal received from the antenna array. The cross-correlation or covariance matrix is transmitted by the control unit 40 to the evaluation unit 50, for example over a wireless radio transmission channel that is established between the carrier platform 20 and the evaluation unit 50.

Figure 2:
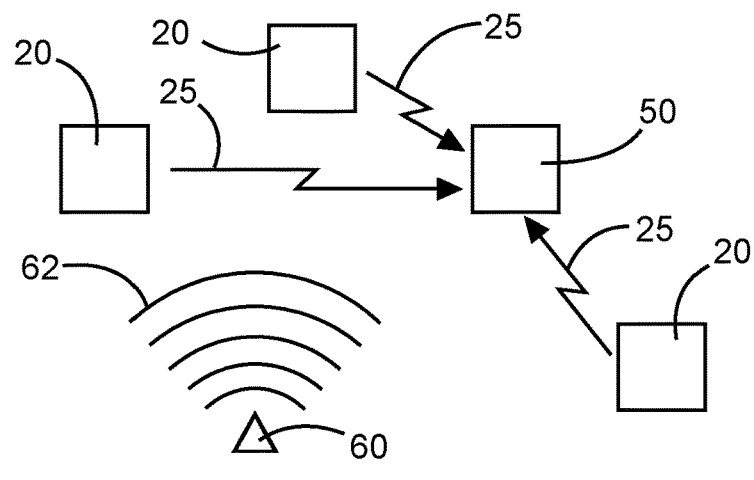
FIG. 2 shows a schematic illustration of a system according to a further example embodiment.

FIG. 2 shows a further example of a system 10 with multiple carrier platforms 20. In this example, all the carrier platforms 20 are mobile units. It is also, however, conceivable that some of the carrier platforms 20 are stationary.

The evaluation unit 50 is spatially separated from all the carrier platforms 20; for example, the evaluation unit 50 is part of a stationary ground unit, or it is arranged in a vehicle. In any event, the evaluation unit 50 performs the function of a central data reception site for data (in particular the cross-correlation or covariance matrix) from the carrier platforms 20.

A data transmission channel 25 is established between each of the carrier platforms 20 and the evaluation unit 50. The data transmission channel enables a transmission of data from the carrier platforms 20 to the evaluation unit 50. The data transmission channel can, however, also be configured as a bidirectional data transmission channel, to enable the transmission of data from the evaluation unit 50 to the carrier platforms 20.

The data transmission channel 25 is, in particular, designed as a wireless transmission channel. The carrier platforms 20 and the evaluation unit 50 comprise transmit/receive units suitable for these purposes, but these are not shown separately. Any suitable transmission protocol and transmission technology can be used for the purposes of the data transmission between the carrier platforms 20 and the evaluation unit 50. Tactical military data links can, in particular, be used.

Figure 3:
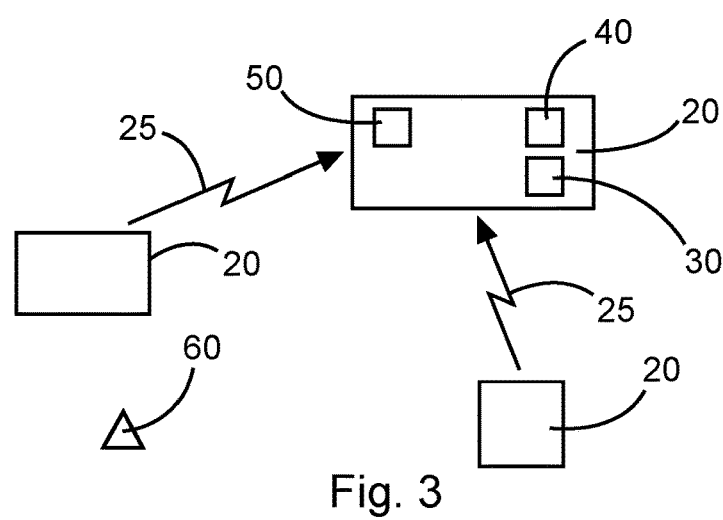
FIG. 3 shows a schematic illustration of a system according to a further example embodiment.

FIG. 3 shows a design of the system of FIG. 2 in which the evaluation unit 50 is not arranged as a separate device, but is linked in terms of location and structure to a carrier platform 20. This does not, however, change anything about the function. The evaluation unit 50 receives the cross-correlation or covariance matrix from all the carrier platforms 20, including the carrier platform 20 to which the evaluation unit 50 is assigned, in this embodiment also. The evaluation unit 50 receives the cross-correlation or covariance matrix from the antenna array 30 that is located on the same carrier platform 20 as the evaluation unit 50, for example via a wired transmission channel. It is, however, also possible in this case to establish a wireless connection between the antenna array 30 and the evaluation unit 50, even when they are arranged on the same carrier platform 20.

Even though only one signal source 60 is shown in FIGS. 1, 2, 3, it is to be noted that the system 20 is also suitable for detecting and locating multiple signal sources 60.

Figure 4:
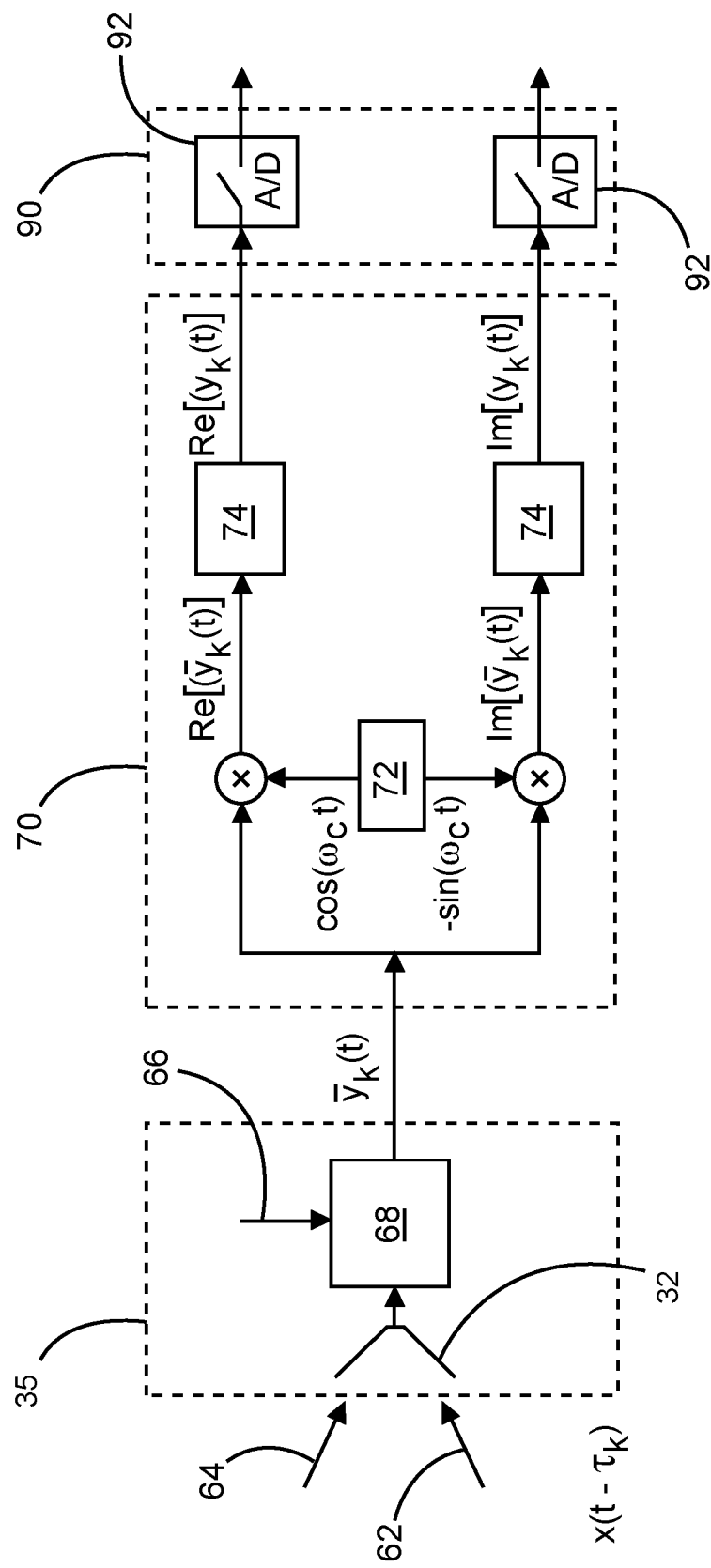
FIG. 4 shows a schematic illustration of the signal processing in an antenna of an antenna array.

FIG. 4 shows a general view of the construction of a receiving unit 35 with antenna 32, along with downstream signal processing in a demodulator 70 or mixer and an analog/digital converter 90. The structure shown in FIG. 4 can be considered a typical, analog RF channel. The antenna 32 receives the signal 62 emitted from a signal source, along with external noise 64. Further noise can also arise or be impressed on the signal in the illustrated arrangement, for example through the electronic components. The signals are transmitted from the antenna 32 to filter units 68. Internal noise 66 may act on the processed signals in the filter units 68 as well as the associated wiring. The signals output by the receiving unit 35 are passed to a demodulator 70 in which the signals are processed using an oscillator 72 and low-pass filters 74. The signals are subsequently passed from the demodulator 70 to an analog/digital converter 90 with two converter units 92. The demodulator 70 and the analog/digital converter 90 each comprise two branches to enable the processing of complex signals with a real component and an imaginary component.

Figure 5:
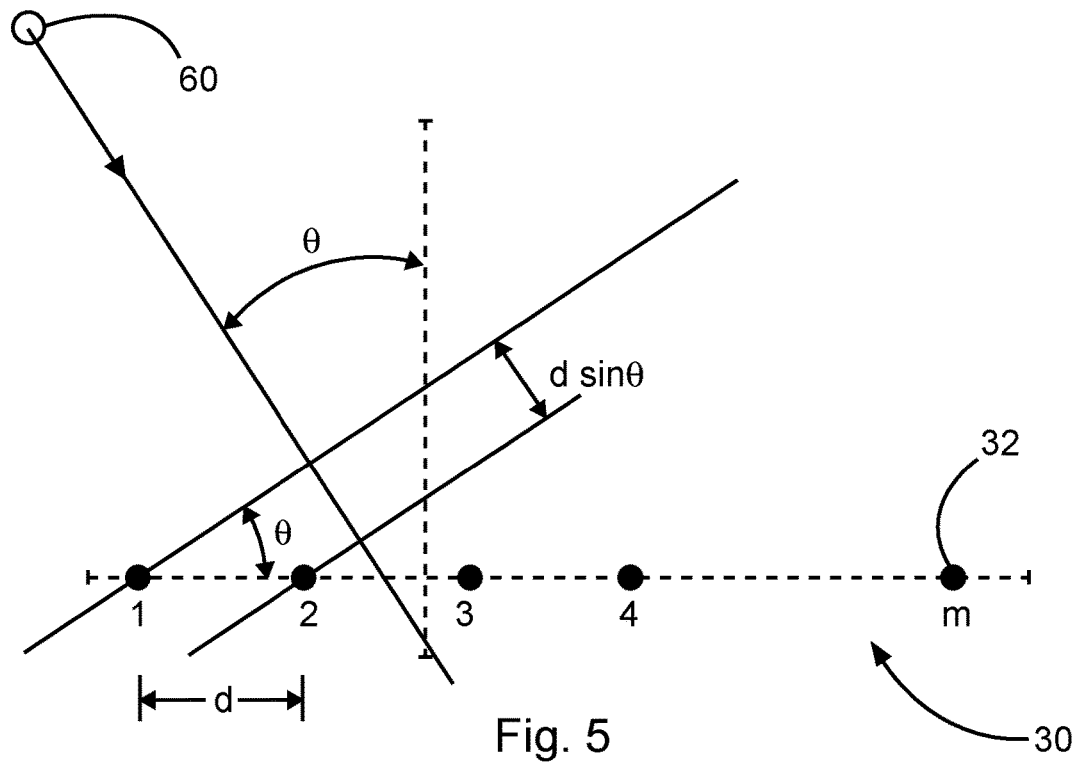
FIG. 5 shows a schematic illustration of an antenna aperture model for the signal processing.

FIG. 5 shows a model for a linear antenna array. It may be the case that the distance d between the individual antennas varies, in order to cover different frequencies or frequency ranges. The antenna array 30 in FIG. 5 comprises m antennas 32.

The digitized received signals on the carrier platform p can be represented using the following equations that describe the ascertainment of a direction using an antenna array:

$$\vec{y} = \vec{a} \cdot \vec{s} + \vec{n} \quad (1)$$

wherein $\vec{y}=[\vec{y}_1, \ldots, \vec{y}_M]^T$ represents the received signals for all the antennas of the antenna array, the complex amplitudes $\vec{a}_d=([a_1(\theta), \ldots, a_M(\theta)])^T$ and $\vec{a}=\text{diag}\{\vec{a}_d\}$ for all the antennas depend on the angle of incidence $\theta_m$, m=1, ..., M, the signal is represented as $\vec{s}=[\vec{s}_1, \ldots, \vec{s}_M]^T$ and the noise as $\vec{n}=[\vec{n}_1, \ldots, \vec{n}_M]^T$.

It is assumed that the narrowband signal is the same for all the antennas, and as a rule only varies in the complex amplitude $a(\theta_m)$, where $\vec{s}_m = \vec{s}_{m*}$, m, m*=1, ..., M applies.

Referring to FIG. 5, the vector a for the antenna array is described as $$a_m(\theta) = e^{-j\omega_m} \quad (2)$$

where $\omega_m = 2\pi f_c c_0^{-1}(m-1)d \sin(\theta)$

The classic beam forming technique uses the following function, which is examined for maxima:

$$\hat{\theta} = \arg\max 1_\theta \vec{a}_d^H \vec{R} \vec{a}_d \quad (3)$$

wherein the covariance matrix R of the antenna array represents the received signal $$\vec{R} = E[\vec{y}^H \vec{y}] \quad (4)$$

Once the angle of incidence $\hat{\theta}$ has been ascertained, it can be used for locating the signal source and transmitted for the triangulation with the aid of further angles of incidence that have been ascertained by other antenna arrays.

Figure 6:
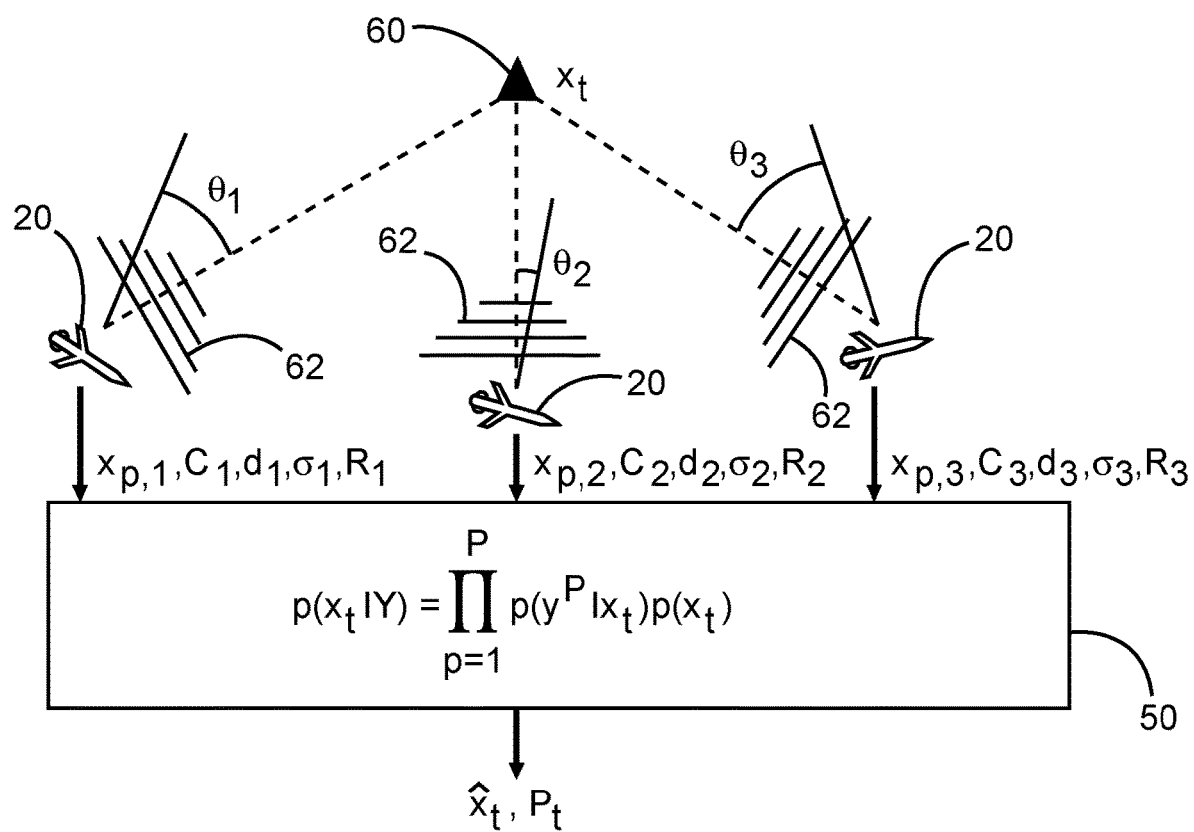
FIG. 6 shows a schematic illustration of a system according to one example embodiment.

By way of example, FIG. 6 shows the approach described herein for detecting and locating a signal source 60. Three carrier platforms 20 with an antenna array (not shown) and a control unit (not shown) acquire a signal 62 emitted from the signal source 60. A cross-correlation or covariance matrix of the received signal is formed for each carrier platform. The cross-correlation or covariance matrix is transmitted to the evaluation unit 50. The evaluation unit 50 uses the cross-correlation or covariance matrix from a plurality or from all the carrier platforms 20 in order to locate the signal source 60. The covariance matrix R from equation (4) is transmitted to the evaluation unit 50. The covariance matrix R describes the properties of the signal received from the individual antenna arrays. Numerical optimization methods can be used to locate the signal sources.

A probability function can be formulated as follows on the basis of equation (1):

$$p(\vec{y}|\theta) \propto \exp\left\{-\frac{1}{2\sigma^2}(\vec{y}-\vec{a}\vec{s})^H(\vec{y}-\vec{a}\vec{s})\right\} \quad (5)$$

The signal s can be replaced by its least-square estimate:

$$\vec{s} = (\vec{a}^H \vec{a})^{-1} \vec{a}^H \vec{y} \quad (6)$$

Substituting equation (6) into equation (5) and using equation (4), we obtain:

$$p(\vec{y}|\theta) \propto \exp\left\{-\frac{1}{2\sigma^2}\left\|(I - \vec{a}(\vec{a}^H\vec{a})^{-1}\vec{a}^H)\vec{y}\right\|^2\right\} \quad (7)$$

$$\propto \exp\left\{-\frac{1}{2\sigma^2} tr\left[(I - \vec{a}(\vec{a}^H\vec{a})^{-1}\vec{a}^H)\vec{R}\right]\right\}$$

The carrier platform p can be described with reference to its position coordinates x, i.e. $p(\vec{y}|\vec{x})$. The angle of incidence of a signal onto an antenna array of a carrier platform p is given as $$\theta_p = \arctan 2(x_p^E, x_p^N) \quad (8)$$

with the relative position of the target position with reference to the carrier platform p:

$$x_\Delta = x - x_p \quad (9)$$

where $x_p$ is the position of a carrier platform.

If uncorrelated white Gaussian noise is assumed, and with the reference to the signals received from a carrier platform p as $\vec{y}^p$, the individual probability function for each carrier platform results, and can be combined as follows:

$$p(\vec{Y}|\vec{x}) = \Pi_{p=1}^{P} p(\vec{y}^p|\vec{x}) \quad (10)$$

where $\vec{Y} = [\vec{y}^1, \ldots, \vec{y}^P]$

The target state vector can be given, on the basis of Bayes theorem, as:

$$p(\vec{x}|\vec{Y}) = \frac{p(\vec{Y}|\vec{x})p(\vec{x})}{p(\vec{Y})} \quad (11)$$

Known filter techniques can be applied to this to perform an estimation, so that the parameters that maximize the probability are ascertained.

As already described further above, the covariance matrix R of a signal acquired by the antenna array must be transmitted to the evaluation unit 50. Taken together, the position of the carrier platform 20 or of the antenna array $\vec{x}_p$, the orientation $\vec{C}_p$ of the antenna array 30, the size and/or geometry $\vec{d}_p$ of the antenna array and the respective noise power levels $\sigma_p^2$ are transmitted in addition to the covariance matrix $\vec{R}^p$.

The evaluation of the probability functions can take place in parallel for all necessary data points. In addition to conventional single- and multi-core processors (CPUs, central processing units), as well as DSPs (digital signal processors) including, for example, FPGAs (field programmable gate arrays) or GPGPUs (general purpose graphics processing units) can be used for this purpose. The information of an individual carrier platform transmitted between the carrier platforms 20 or from the carrier platforms 20 to the evaluation unit 50 does not in itself have to be restricted to the data that unambiguously locates a signal source. Rather is the data from multiple carrier platforms combined in the evaluation unit, and the location of the signal source does not take place until reaching the evaluation unit 50, as shown in FIG. 6.

The carrier platforms 20 work together and merge the signals they have acquired in the evaluation unit 50. The carrier platforms 20 thus do not have to be able to locate the signal source 60 on the basis of their own data. The location of the signal source 60 rather takes place in the evaluation unit 50 which utilizes the cross-correlation or covariance matrices of the signals 62 acquired by the individual carrier platforms 20.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 System
20 Carrier platform
25 Data transmission channel
30 Antenna array
32 Antenna
35 Receiving unit
40 Control unit
50 Evaluation unit
60 Signal source
62 Emitted signal
64 External noise
66 Internal noise
68 Filter unit
70 Demodulator
72 Oscillator
74 Low-pass filter
90 Analog/digital converter
92 Converter unit

The invention claimed is:

1. A system for detecting and locating a signal source, the system comprising:
an antenna array with a plurality of antennas;
a control unit connected to the antenna array;
an evaluation unit configured to receive data from the control unit;
wherein the antennas are configured to acquire a signal emitted by the signal source,
wherein the control unit is configured to ascertain a cross-correlation or covariance matrix of a signal received from the antenna array,
wherein the control unit is configured to transmit the cross-correlation or covariance matrix to the evaluation unit,
wherein the evaluation unit is configured to ascertain a position of the signal source based on the cross-correlation or covariance matrix received from the control unit, and
wherein the control unit is configured also to transmit information as follows about the antenna array to the evaluation unit, in addition to the cross-correlation or covariance matrix:

a position of the antenna array at a time point at which the signal emitted by the signal source was acquired;
an alignment of the antenna array;
a size or geometry of the antenna array; and
a noise power level.

2. The system of claim 1, wherein the system comprises a plurality of antenna arrays and a plurality of control units,
wherein a respective control unit is assigned to an antenna array,
wherein each antenna array of the plurality of antenna arrays is spatially distanced from other antenna arrays of the plurality of antenna arrays and configured to acquire the signal emitted by the signal source from a respective separate direction,
wherein each control unit is configured to ascertain the cross-correlation or covariance matrix of the antenna array that is assigned to it, and to transmit the ascertained cross-correlation or covariance matrix to the evaluation unit, and
wherein the evaluation unit is configured to ascertain the position of the signal source based on at least some of the cross-correlation or covariance matrices received from the plurality of control units.

3. The system of claim 1, wherein the evaluation unit is spatially separate from all the antenna arrays and control units.

4. The system of claim 1, wherein the evaluation unit is together with the antenna array and the control unit in a mobile unit.

5. The system of claim 1, wherein the control unit is configured to transmit the cross-correlation or covariance matrix of the antenna array from a plurality of temporally sequential signal acquisition processes to the evaluation unit.

6. A method for detecting and locating a signal source, comprising:
acquiring a signal emitted by the signal source by an antenna array;
ascertaining a cross-correlation or covariance matrix of the acquired signal;
transmitting the cross-correlation or covariance matrix to an evaluation unit; and
ascertaining a position of the signal source in the evaluation unit based on the cross-correlation or covariance matrix;
wherein the signal emitted by the signal source is acquired by a plurality of antenna arrays that are at different geographical positions;
wherein the cross-correlation or covariance matrix is ascertained for each acquisition of the signal emitted by the signal source by each of the plurality of antenna arrays; and
wherein the position of the signal source is ascertained based on at least some of the ascertained cross-correlation or covariance matrices.

7. The method of claim 6, wherein the signal emitted by the signal source is acquired with a single antenna array at different time points at different positions.

8. The method of one of claim 6, wherein, in addition to the cross-correlation or covariance matrix, information about the antenna array is also transmitted to the evaluation unit as follows:
a position of the antenna array at a time point at which the signal emitted by the signal source was acquired;
an alignment of the antenna array;
a size and or geometry of the antenna array; and
a noise power level.

* * * * *